United States Patent [19]
Erickson et al.

[11] Patent Number: 5,328,584
[45] Date of Patent: Jul. 12, 1994

[54] PASSIVE CIRCULATION IN ELECTROLYTIC FLUID TREATMENT SYSTEMS

[75] Inventors: Robert K. Erickson, Belmont, Calif.; Michael D. Hanrahan, Snohomish, Wash.

[73] Assignee: Water Regeneration Systems, Inc., Belmont, Calif.

[21] Appl. No.: 901,599

[22] Filed: Jun. 19, 1992

[51] Int. Cl.⁵ .............. C25B 15/02; C25B 15/08; C25D 21/06; B01D 21/24
[52] U.S. Cl. ................... 204/229; 204/237; 204/238; 204/239; 210/104; 210/195.1
[58] Field of Search .......... 204/237, 238, 248, 229; 210/104, 195.1

[56] References Cited

U.S. PATENT DOCUMENTS

| | | | |
|---|---|---|---|
| 767,195 | 8/1904 | Zerbe | 204/240 |
| 951,311 | 3/1910 | Hartman | 204/152 |
| 2,640,026 | 5/1953 | Whittington | 204/149 |
| 2,864,750 | 12/1958 | Hughes, Jr. et al. | 204/149 |
| 3,234,110 | 2/1966 | Beer | 204/290 X |
| 3,256,504 | 6/1966 | Fidelman | 204/248 |
| 3,313,721 | 4/1967 | Teel | 204/290 X |
| 3,523,891 | 8/1970 | Mehl | 210/44 |
| 3,679,556 | 7/1972 | Doevenspeck | 204/269 |
| 3,691,050 | 9/1972 | Sayre | 204/219 |
| 3,728,245 | 4/1973 | Preis et al. | 204/275 |
| 3,817,848 | 6/1974 | Scragg | 204/152 |
| 3,865,710 | 2/1975 | Phipps | 204/228 |
| 3,925,176 | 12/1975 | Okert | 204/152 |
| 3,933,606 | 1/1976 | Harms | 204/152 |
| 3,987,816 | 10/1976 | Lange | 204/238 X |
| 4,090,530 | 5/1978 | Lange | 204/238 X |
| 4,119,520 | 10/1978 | Paschakarnis et al. | 204/276 |
| 4,149,953 | 4/1979 | Rojo | 204/269 |
| 4,248,684 | 2/1981 | Doniat | 204/149 |
| 4,256,814 | 3/1981 | Avigal et al. | 204/237 X |
| 4,263,114 | 4/1981 | Shindell | 204/149 |
| 4,306,952 | 12/1981 | Jansen | 204/149 |
| 4,321,125 | 3/1982 | Nazarian et al. | 204/152 X |
| 4,419,206 | 12/1983 | Frame | 204/228 |
| 4,425,216 | 1/1984 | Neymeyer | 204/270 |
| 4,436,601 | 3/1984 | Branchick et al. | 204/149 |
| 4,465,573 | 8/1984 | O'Hare | 204/180 P |
| 4,525,253 | 6/1985 | Hayes et al. | 204/149 |
| 4,572,775 | 2/1986 | Paniagua | 204/229 |
| 4,623,436 | 11/1986 | Umehara | 204/149 |
| 4,734,176 | 3/1988 | Zemba, Jr. et al. | 204/149 |
| 4,769,119 | 9/1988 | Grundler | 204/149 |
| 4,802,991 | 2/1989 | Miller | 204/149 X |
| 4,842,724 | 6/1989 | Bray et al. | 210/104 |
| 4,917,782 | 4/1990 | Davies | 204/229 X |
| 5,034,123 | 7/1991 | Tanaka et al. | 210/195.1 |
| 5,062,940 | 11/1991 | Davies | 204/228 |

FOREIGN PATENT DOCUMENTS 0329562  8/1989  European Pat. Off. .
203896  11/1983  Fed. Rep. of Germany .

*Primary Examiner*—Donald R. Valentine
*Attorney, Agent, or Firm*—Christensen, O'Connor, Johnson & Kindness

[57] ABSTRACT

A fluid system (10) is disclosed including a filter system (16) for the moving contaminants from fluid provided by a fluid source (12) to a supplied environment (14). The filter system includes an electrolytic or electrostatic cell (26) which is operated by a control circuit (28). The control circuit is programmed to continue to operate the cell after active water flow from fluid source is discontinued. The cell is designed to passively circulate fluid entirely within the cell, allowing efficient continued filtration to occur. As a result, more efficient matching of the cell to the particular supplied environment may be achieved. Several alternative constructions of the cell are disclosed.

33 Claims, 9 Drawing Sheets 5,328,584

PASSIVE CIRCULATION IN ELECTROLYTIC FLUID TREATMENT SYSTEMS

FIELD OF THE INVENTION

This invention relates generally to electrolytic fluid treatment systems and, more particularly, to the control of fluid circulation through such systems.

BACKGROUND OF THE INVENTION

The treatment of fluids is of interest in a variety of applications. As will be appreciated, both the type of fluid and the nature of the treatment may vary considerably from one application to another.

In that regard, one commonly treated fluid is water. Water from many sources must be treated before being used for internal consumption. Similarly, the quality of water in, for example, swimming pools may be adversely affected by use, requiring periodic or continuous treatment.

In each of these applications, the treatment of the water may be intended to achieve a variety of objectives. For example, particulates may need to be removed; chemical characteristics, such as chlorine, metal, alkaline, and oxygen content, may need to be controlled; and biological materials, such as algae, bacteria, and organic wastes, may need to be killed.

As suggested previously, other fluids may also require various forms of treatment. For example, engines and other machines that employ a fluid lubricant typically introduce impurities into the lubricant that must be removed if the lubricant's effectiveness is to be maintained. Also, impurities are typically removed from fluids employed in hydraulic and pneumatic systems to ensure reliable system operation.

One method of treating fluids that has found relatively widespread use and acceptance is the electrolytic treatment of fluids. The fluid to be treated is passed between one or more pairs of electrodes. An electric potential, applied to the electrodes, establishes an electric current between the electrodes. As a result, impurities in the fluid migrate and adhere to the electrodes. The electric field may also kill biological contaminants and alter the chemical structure of the fluid.

One example of such an electrolytic system is described in U.S. Pat. Nos. 4,917,782 and 5,062,940. These patents disclose an electrolytic liquid purification system, in which the liquid to be treated is passed through a set of electrode plates. An electric field and current applied between the plates removes impurities from the liquid and causes the impurities to adhere to the plates. By periodically reversing the direction of current flow between the plates at select time intervals, the impurities may be purged from the plates and trapped by an external mechanical filter.

As will be appreciated, the ability of a such system to effectively achieve a a desired filtration or purification level in the fluid is dependent upon a variety of factors. For example, the extent and nature of the contamination, the rate at which fluid flows through the system, and the construction and operation of the system, all influence the system's ability to achieve the desired fluid quality level. If the fluid is severely contaminated, or passed through the system relatively quickly, the system must be constructed to rapidly remove contaminants. Often, such a system is relatively expensive to construct and operate, when compared to a system that removes contaminants at a slower rate.

In view of the preceding observations, it would be desirable to provide a system for removing relatively highly levels of impurities or contaminants from fluids efficiently, without undue complexity and expense. It would also be desirable to provide a system for treating fluids at relatively high flow rates, for at least specified intervals.

SUMMARY OF THE INVENTION

In accordance with this invention, a system is disclosed for filtering a fluid. The system includes a storage element for receiving the fluid. A passive filtration and circulation system is included to filter the fluid and produce a gradient in the fluid that induces circulation of the fluid in the storage element.

In accordance with a particular aspect of the invention, the passive filtration and circulation system includes at least one pair of electrodes. A circuit is provided for applying electric energy to the pair of electrodes to establish a gradient in the fluid. A first fluid flow path is defined in the storage element to enhance the circulation of fluid, induced by the gradient, in the storage element. A second fluid flow path is further defined in the storage element when circulation of the fluid in the storage element is not to be induced in the storage element by the gradient.

In accordance with another aspect of this invention, the passive filtration and circulation system includes at least one pair of electrodes and a housing having inlet, outlet, and recirculation ports. The housing is positioned within the storage element and the pair of electrodes is positioned within the housing. A damper is included to control the alternative introduction of fluid into the housing via the inlet and recirculation ports.

In accordance with yet another aspect of the invention, a method is disclosed for controlling an electrolytic system for treating a fluid. The electrolytic system is positioned in a fluid flow path and is provided with an interruptible supply of fluid. The method includes the step of providing energy to the electrolytic system. Interruptions in the supply of fluid to the flow path are further sensed. The step of providing energy to the electrolytic system is terminated some controllable interval of time after an interruption of the supply of fluid is sensed. The method may also include the step of treating the fluid in the flow path. Then, the steps of treating and sensing can be monitored to allow the interval of time to be controlled.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
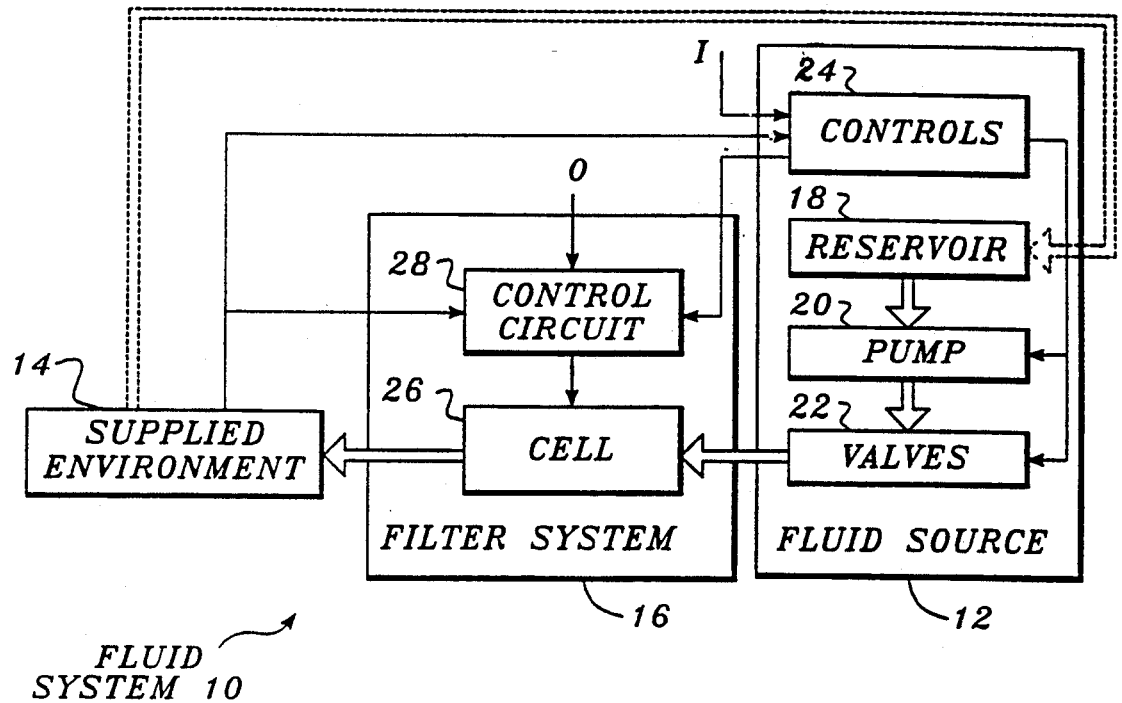
FIG. 1 is a block diagram depicting an electrolytic filter system constructed in accordance with the present invention, including an electrolytic cell for use in actively and passively filtering fluid from a fluid source before passing the fluid on to a supplied environment.

Referring now to FIG. 1, a fluid system 10 constructed in accordance with the invention is shown. The fluid system 10 includes a fluid source 12 that provides fluid to a supplied environment 14 via an electrolytic fluid treatment system, such as filter system 16. As will be described in greater detail below, the electrolytic filter system 16 is designed to passively circulate and filter fluid received from source 12, as well as filter fluid that is actively circulated through system 16. Thus, the filter system 16 advantageously allows predetermined filtration levels to be achieved more efficiently than prior art systems.

Addressing now the construction of the various components of fluid system 10 individually, the fluid source 12 may take any of a variety of forms. In the arrangement shown in FIG. 1, the fluid source 12 preferably includes a reservoir 18, pump 20, one or more valves 22, and controls 24. For specificity, the fluid processed by these components will be described as water in the ensuing discussion, although the invention has applicability to a variety of different fluids including both liquids and gases.

The reservoir 18 included in fluid source 12 is constructed to store the water to be treated by filter system 16. Reservoir 18 may be formed of a fluid impervious material, such as fiber glass wrapped (reinforced), acrylonitrite butadiene styrene (ABS), and has a volume of roughly 100 liters or more. As will be appreciated from FIG. 1, the reservoir 18 may receive recirculated water from the supplied environment 14 and supplemental water from an outside source. The reservoir 18 then provides this water to pump 20.

The pump 20 is included to draw water from reservoir 18 and force it through the remainder of fluid system 10. The pump 20 may be of any conventional design suitable for actively supplying water to the filter system 16 at a controllable flow rate of, for example, up to 25 liters per minute. As will be appreciated, if the reservoir 18 is elevated above the remainder of the system 10, the pump 20 can be eliminated, allowing the desired pressurized water flow to instead be achieved gravitationally.

The valve or valves 22 regulate the flow of water from pump 20 to the filter system 16. In the preferred arrangement, a single one-way valve 22 is employed. The valve 22 is preferably operable over a range of positions, allowing the flow of water from pump 20 to be totally restricted, partially restricted, and substantially unrestricted.

The controls 24 are included to regulate the operation of the pump 20 and valves 22 in response to, for example, inputs from the supplied environment 14 and operator O. The controls 24 may allow the flow rate established by the pump 20 to be controlled, or the pump 20 to be turned on or off entirely. Similarly, the controls 24 may allow the relative position of valve 22 to be adjusted over a range of positions from fully open to fully closed. The controls 24 also may be at least partially responsible for influencing the operation of filter system 16. As will be appreciated, the particular type of controls 24 employed may vary considerably, including, for example, timers and relays or a microprocessor-based system linked to suitably responsive circuits in the pump 20, valves 22, and filter system 16.

Turning now to a discussion of the supplied environment 14, environment 14 may take any of a variety of forms depending upon the nature of the fluid system 10. For example, the supplied environment 14 may be a swimming pool or drinking water outlet. As noted previously, water from the supplied environment 14 may, in some instances, be returned to fluid source 12 after use.

The most important component of fluid system 10 is the electrolytic filter system 16. As shown in FIG. 1, the filter system 16 includes an electrolytic cell 26 and control circuit 28. As will be described in greater detail below, the cell 26 and control circuit 28 cooperatively apply an electric field to water passed through the cell, to filter and otherwise treat the water. The cell 26 and control circuit 28 further allow water to be circulated and filtered by cell 26 when water flow through the cell is not actively induced by the fluid source 12. This will be referred to in the specification and claims as passive circulation and filtration.

Figure 2:
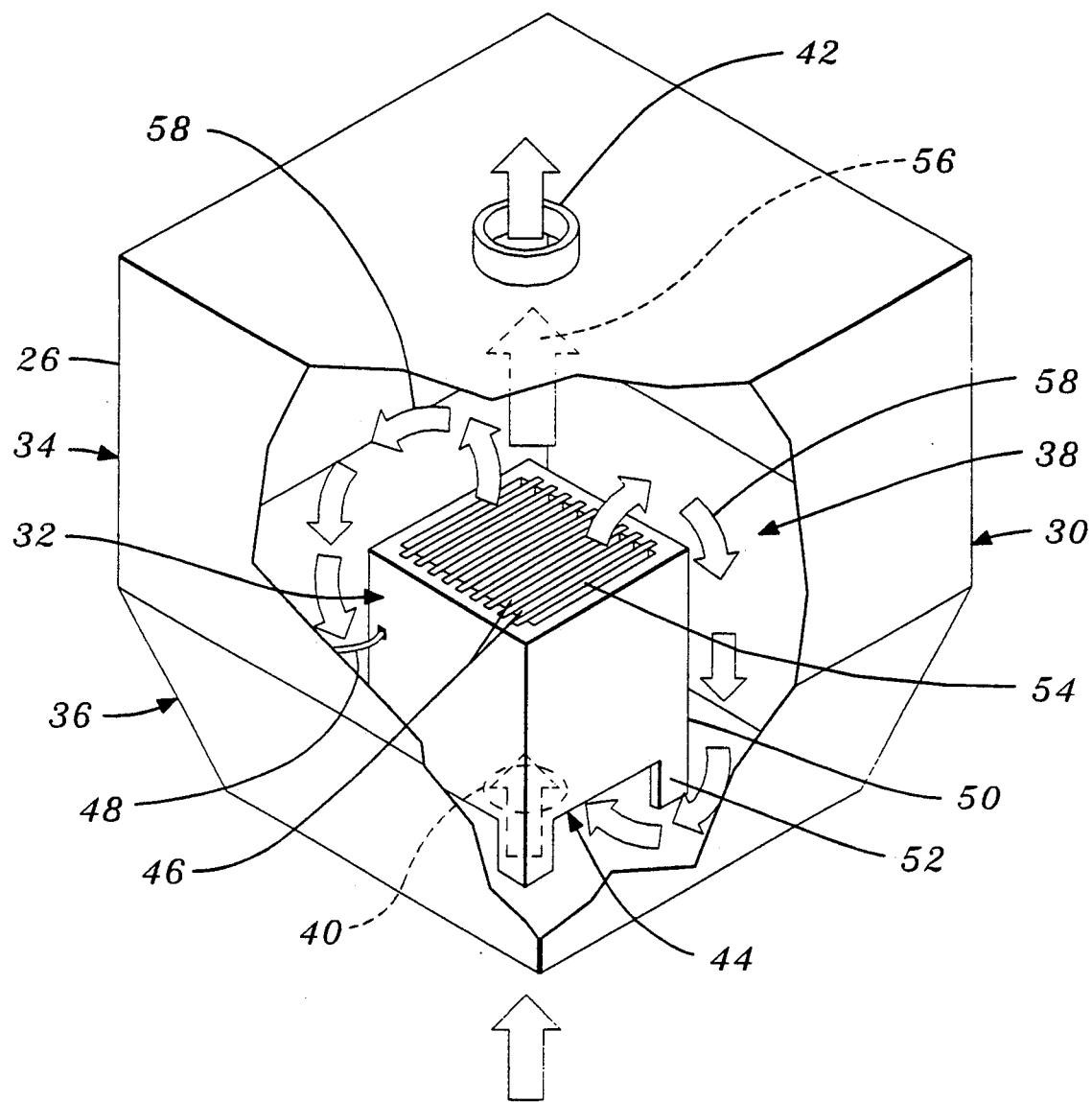
FIG. 2 is an illustration of a first embodiment of the electrolytic cell of FIG. 1, in which a single set of fixed structural elements define both active and passive fluid flow paths through the cell.

Reviewing these components of filter system 16 in greater detail, a first "damperless" embodiment of cell 26 is shown somewhat schematically in FIG. 2. As depicted, cell 26 includes a tank 30 for receiving and temporarily storing water that is treated by cell 26. An electrode assembly 32 is supported in the bottom of tank 30 and is responsible for applying the desired electric field to water within the tank 30.

The cell tank 30 includes an upper section 34, having a substantially uniform horizontal cross-section, and a tapered lower section 36. The upper section 34 and lower section 36 cooperatively define a passive recirculation chamber 38. Water is introduced into tank 30 and passive recirculation chamber 38 from the fluid source 12 via a fluid inlet 40, which is centrally positioned in the bottom of tank 30. Similarly, water is passed from the tank 30 and chamber 38 to the supplied environment 14 via a fluid outlet 42 centrally positioned in the top of tank 30. Although not shown in FIG. 2, conduits carry fluid to and from the fluid inlet 40 and fluid outlet 42.

In the preferred arrangement, cell tank 30 may be manufactured from, for example, fiber glass wrapped (reinforced) ABS and has a volume of roughly 100 liters. The lower section 36 of tank 30 is tapered to aid in recirculation. Although tank 30 is illustrated as having a rectangular cross section normal to the path defined between fluid inlet 40 and fluid outlet 42, a circular cross section is employed in the preferred embodiments described below and other cross sections may be used as desired.

As noted previously, the electrode assembly 32 is supported in the lower section 36 of tank 30, above the fluid inlet 40. Assembly 32 includes an electrode housing 44, a plurality of electrode plates 46, and electrical connections 48. Addressing each of these components individually, the electrode housing 44 has a body 50 supported above the fluid inlet 40 by four legs 52. The body 50 includes four walls, two of which are provided with opposed, vertically extending slots 54 for vertically supporting the electrode plates in a horizontally spaced apart relationship.

The electrode housing 44 is made of a suitable water impermeable dielectric material, such as polyethylene terephthalate glycol (PETG). The overall dimensions of the body are roughly 31 by 8.5 by 6.5 centimeters. The legs 52 are roughly 2.5 centimeters long. The slots 54 are roughly 0.06 centimeters wide, spaced apart by a distance of roughly 0.2 centimeters, and may extend the full length of the electrode plates or be shorter and spaced apart to support the electrode plates at several points.

The spaced-apart electrode plates 46 allow water to flow vertically therebetween. With an electric field established between adjacent electrode plates 46, the desired treatment of the water can be achieved. More particularly, as will be described in greater detail below, the control circuit 28 operates alternating electrode plates 46 as anodes and cathodes.

In the preferred arrangement, the electrode plates 46 are made of an electrically conductive, fluid impervious material, such as a ceramic. In addition, seventeen electrode plates 46 are employed. Each plate 46 is roughly 20.3 by 6.0 by 0.06 centimeters. As will be appreciated, epoxy can be applied to the edges of the electrode plates 46 to retain plates 46 within housing 44. Alternatively, if the housing 44 is formed in halves, the electrode plates 46 may simply be retained in place by the housing 44 upon assembly.

The electrical connections 48 made at the various electrode plates 46 may also be provided in a variety of different ways. For example, separate wires extending between the control circuit 20 and each of the anodes and cathodes may be employed. Alternatively, all of the anodes can be connected in parallel and all of the cathodes connected in parallel, for example, by a first conductive base plate provided on one side of the anodes and a second conductive base plate provided on the other side of the cathodes. Then, a single anode and cathode wire pair can be connected between the parallel-connected electrode plates 46 and the control circuit 20.

As one final point concerning the electrolytic cell 26, several different fluid flow paths may be established across the components described above. In that regard, water may flow along an active water flow path 56 extending from the fluid inlet 40, through the spaces between electrode plates 46, and ending at the fluid outlet 42. Water may also be recirculated along a passive water flow path 58. The passive water flow path 58 extends upward through the spaces between electrode plates 46 and then downward around all sides of the electrode assembly 32, before turning upward again.

Figure 3:
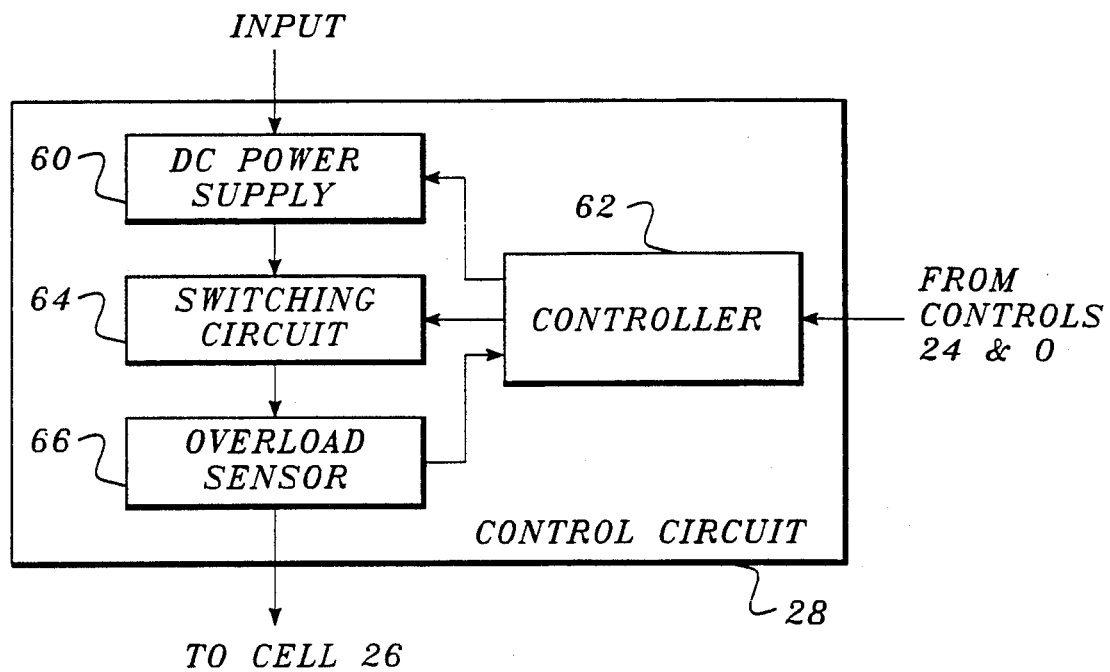
FIG. 3 is a block diagram of a control circuit included in the system of FIG. 1 to regulate the operation of the electrolytic cell.

Having reviewed the construction of cell 26, the construction of control circuit 28 will now be considered in greater detail. As shown in FIG. 3, the control circuit 28 includes a DC power supply 60, controller 62, switching circuit 64, and overload sensor 66.

Reviewing these components of control circuit 28 individually, the DC power supply 60 may be of any conventional design and provides energy for use by the electrolytic cell 26 in achieving the desired treatment of the water. As indicated in FIG. 3, the power supply 60 receives inputs from controller 62, allowing the energy provided by supply 60 to be controlled.

In a preferred embodiment, power supply 60 includes a transformer for converting a source of AC input voltage from one level to another, reduced level. A rectifier circuit may also be included to convert the transformed AC voltage to a suitable DC voltage. Finally, a regulation and filtration circuit may be included to ensure that the rectified voltage, available between the positive and negative output terminals of supply 60, has the desired DC characteristics.

The controller 62 is employed to regulate the operation of several different components of the control circuit 28, in response to inputs from the operator O and the fluid source controls 24. Although the controller 62 may include a microprocessor-based circuit, in the embodiment of the control circuit 28 shown in FIG. 3, relatively limited functions are to be performed by the controller 62 and a simpler arrangement including, for example, timers and relays can be employed. Because the construction and operation of a controller 62 suitable for achieving the various assigned tasks are well understood, further elaboration is not provided.

The switching circuit 64 is included to regulate the transfer of electrical energy from power supply 60 to the cell 26. As will be described in greater detail below, switching circuit 64 may interrupt the flow of electrical current to cell 26 in response to the operation of fluid source 12. In addition, the switching circuit 64 may periodically reverse the connections between the electrode plates 46 and power supply 60, switching the polarity of the electrode plates 46 to cause impurities collected on the plates to be discharged. Finally, switching circuit 64 may terminate the flow of electrical current to cell 26 when the overload sensor 66 determines that the current has exceeded some predetermined acceptable threshold levels.

As will be appreciated, the switching circuit 64 may take a variety of forms. For example, circuit 64 may include an electromechanical relay having a plurality of switches that can be selectively opened and closed in response to electrical inputs from controller 62. By appropriately connecting the various switches into the current paths between power supply 60 and cell 26, the flow of current to cell 26 can thus be controlled by applying suitable inputs to the relay.

Finally, the overload sensor 66 is included to monitor the current provided to cell 26. As noted previously, if the current exceeds some acceptable threshold, the controller 62 and switching circuit 64 will respond by terminating the flow of current to cell 26. One overload sensor 66 suitable for use in the control circuit 28 is an ammeter that produces an electrical output representative of measured currents over a range including the threshold.

Having reviewed the basic construction of cell 26 and control circuit 28, the cooperative operation to these components to treat actively and passively circulated water will be described. First, consider the use of filter system 16 to treat water that is actively flowing through the active flow path 56 in tank 30.

The operator initially starts system 10 by providing an input I to the controls 24 of fluid source 12. In response, the valve 22 is opened and pump 20 draws water from reservoir 18, pumping it through valve 22 to the inlet 40 of cell 26. The water pressure established by pump 20 causes the water to flow, in substantial part, from the fluid inlet 40, between the electrode plates 46, and out the fluid outlet 42, i.e., along the active flow path 56.

While the pump 20 is on, the fluid source controls 24 provide an output to the controller 62 of control circuit 28, indicating the occurrence of active water flow. The controller 62 responds by providing inputs to the DC power supply 60 and switching circuit 64, causing energy to be applied to cell 26. Specifically, an electric potential of roughly sixty volts is established between the anode and cathode electrode plates and an electric current on the order of twenty amperes flows therebetween. As a result, the water flowing along the active flow path 56 between the electrode plates is electrolytically treated.

During this "active" mode of operation, different operating conditions may be encountered. For example, dependent upon the level of impurities in the water being treated, the strength of the electric fields applied between the electrode plates, the number and area of the electrode plates, and the rate at which water is flowing along the active flow path, the cell 26 may, or may not, be able to ensure that the water provided to supplied environment 14 exhibits the desired quality level.

Assuming that the cell 26 is able to continuously achieve the desired quality level for water actively flowing through cell 26, the control circuit 28 may continue to provide energy to cell 26 for as long as active water flow occurs. As will be described in greater detail below, if filter system 16 is able to continuously maintain a higher level of water quality than is required, greater system efficiency may be achieved by monitoring the water quality and interrupting the supply of energy to cell 26 to a degree sufficient to achieve only the desired water quality level.

In many instances, however, the system 16 may be unable to achieve the desired water quality during active operation of cell 26. As will be appreciated, the system 16 could, perhaps, be altered to achieve the desired performance by increasing the number and size of the electrode plates 46 or increasing the energy applied to the electrode plates. In accordance with the present invention, a more efficient approach to the treatment of water during such intermittent active operation has been developed.

More particularly, the water in cell 26 is passively circulated and treated when active flow is not occurring to increase the quality of water in tank 30 above the desired level. Then, when active water flow subsequently occurs, the high quality water stored within cell 26 will mix with the lower quality water continuously produced during active operation. Provided that active flow operation is not continued for too long an interval, the mixed water then meets the desired water quality standards.

Reviewing this aspect of the operation of system 16 in greater detail, first assume that the operator O has shut off pump 20 and closed valve 22 by providing an appropriate input to the fluid source controls 24. In that event, the active flow of water through cell 26 along path 56 no longer occurs and an output, indicative of the terminated active flow, is provided by controls 24 to the control circuit controller 62. As long as the active water flow was terminated recently, the quality and temperature of the water will typically be relatively uniform throughout tank 30.

Once the active water flow has been interrupted, controller 62 initiates a passive flow timer, which may be initialized to expire at some preset or operator selectable time limit. The controller 62 continues to provide inputs to power supply 60 and switching circuit 64 until the timer expires, causing energy to be applied to cell 26. Thus, water between the electrode plates 46 continues to be treated.

The continued electrolytic operation of cell 26 in this manner begins to establish gradients within tank 30. More particularly, the electrical current flowing through the water between electrode plates 46 increases the temperature of the water. As will be appreciated, the magnitude of the temperature increase is dependent upon numerous variables relating to the construction and operation of system 16, as well as the water being treated.

The water warmed between electrode plates 46 then rises in the tank 30, displacing colder water in the upper section 34 of tank 30. The colder water migrates to the lower section 36 of tank 30, being directed to the base of the electrode assembly 32 by the tapered lower section 34 of tank 30. There, the colder water is drawn up between the electrode plates 46 to replace the water previously warmed. The continued operation of cell 26 in this manner establishes water circulation along the passive flow path 58.

The electrolytic action of cell 26 may, similarly, induce an oxygen gradient in the tank 30. In that regard, current flowing through the water between plates 46 typically increases the oxygenation of the water. More highly oxygenated water rises in the housing, displacing more lowly oxygenated water, which is then drawn up between the electrode plates 46 from the bottom of tank 30. As a result, the passive flow path 58 is again completed.

In both cases, the rate of circulation around the passive flow path 58 depends in part upon the magnitude of the gradients established. As will be appreciated, these gradients can be controlled, at least initially, by increasing the amount of electrical energy applied to the water between the electrodes with suitable outputs from controller 62 to power supply 60. Thus, as described in greater detail below, some control over the passive circulation rate can be achieved.

Eventually, the controller 62 determines that the time interval monitored by the passive flow timer has elapsed. The controller 62 responds by terminating further electrolytic operation of cell 26. If the time interval is relatively long, the water will be electrolytically treated for a relatively long time and the water's quality at the end of the interval will be relatively high. On the other hand, if the time interval is relatively short, the water's quality at the end of the interval will be lower. As a result, the time interval used will typically be based upon a predetermined evaluation of the demands of supplied environment 14.

Figure 4:
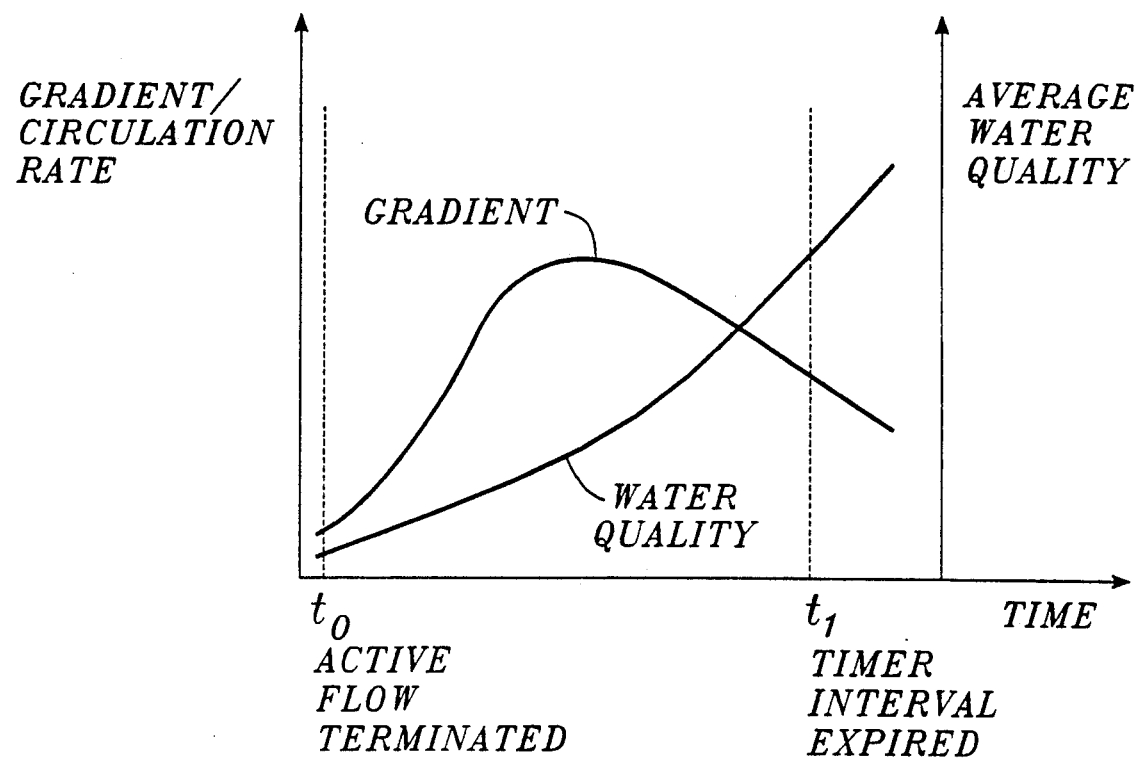
FIG. 4 is a graph illustrating the relationship between circulation, gradients, and time involved in the passive operation of the cell of FIG. 2.

The passive operation of cell 26 is depicted graphically in FIG. 4. As shown, the temperature and oxygen gradients are relatively low when active flow is first terminated because the water has been relatively thoroughly mixed during active flow. The gradients then rise relatively rapidly as water between the electrode plates 46 is heated and water outside the electrode assembly 32 cools. Eventually, the gradients begin to decay because, for example, the cell 26 is unable to introduce heat into the water more quickly than it is radiated by cell 26.

As also shown in FIG. 4, the water quality starts at a relatively low level and then may rise relatively uniformly. Although not shown in FIG. 4, the water quality curve would necessarily flatten out at some point corresponding to expiration of the time interval employed by the passive timer. As will be appreciated, FIG. 4 provides qualitative information only and the relative shapes and amplitudes of the gradient and water quality curves will be influenced by a variety of parameters dependent upon the water being filtered and the operation of the cell 26.

Figure 5:
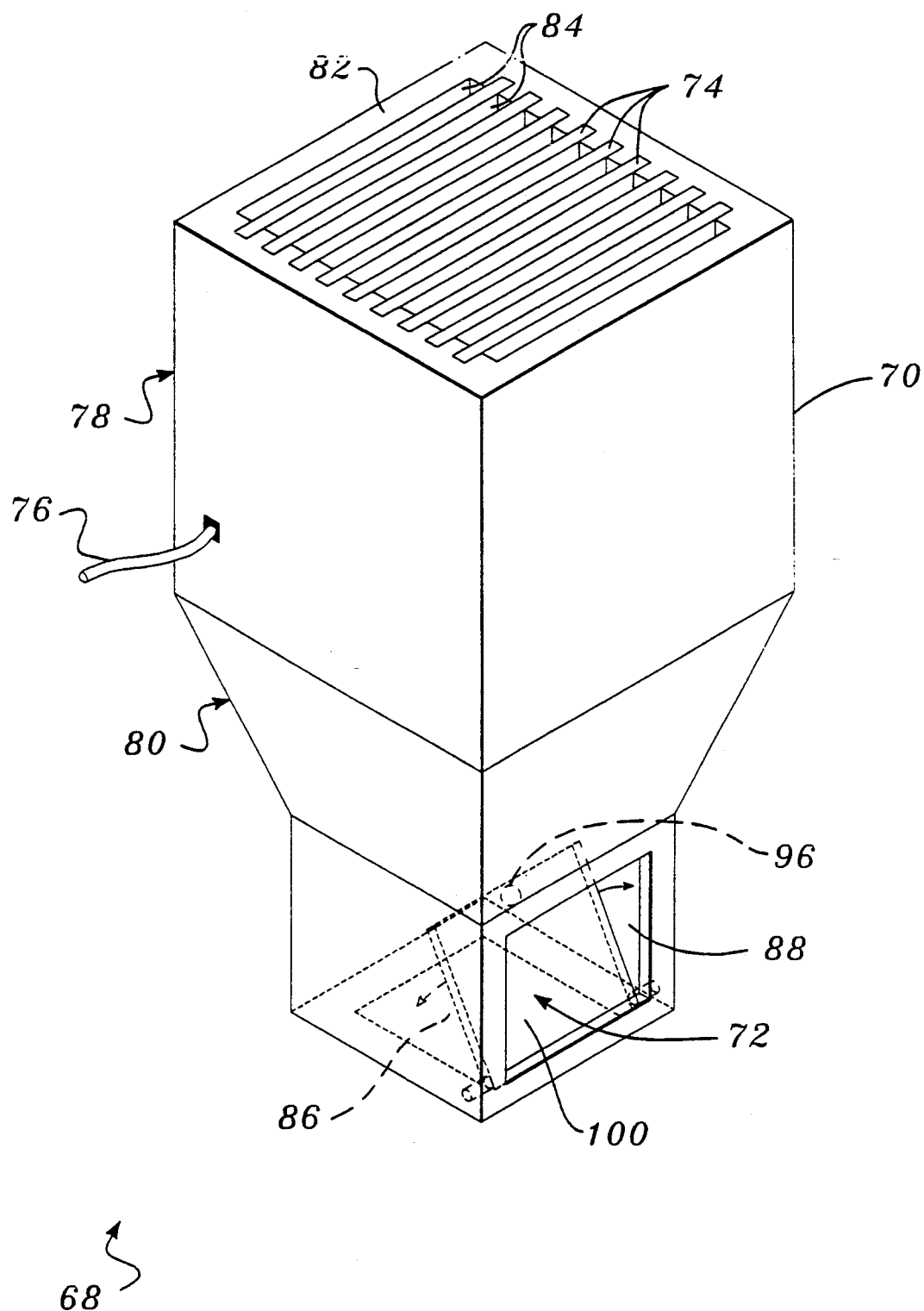
FIG. 5 is an illustration of a second embodiment of the electrolytic cell of FIG. 1, in which a movable damper is included to control both active and passive fluid flow paths through the cell.

Turning now to a discussion of alternative embodiments of cell 26, one such embodiment employs a manual damper to further assist in achieving the desired passive circulation. In that regard, FIG. 5 illustrates an electrode assembly 68 for use in the manual damper embodiment of the cell. As will be appreciated, the electrode assembly 68 can be directly substituted for the electrode assembly 32 shown in FIG. 2. The other components of the filter system 16 remain the same.

Reviewing the details of electrode assembly 68, as shown in FIG. 5, assembly 68 includes an electrode support structure 70, damper 72, electrode plates 74, and electrical connections 76. The electrode support structure 70 supports the electrode plates 74 and provides a confined water flow path across the electrode plates 74. As shown in FIG. 5, the electrode support structure 70 includes an upper section 78 and a lower section 80.

The upper section 78 has a substantially uniform cross section when viewed normal to the path of water flow. The upper section 78 is also open on top, defining a water outlet 82. A plurality of opposed, vertically extending channels 84 are provided in the upper section 78 to vertically support the electrode plates 74 in a horizontally spaced apart arrangement. As will be appreciated, the dimensions and construction of the upper section 78 are preferably the same as those previously described in connection with the body 50 of the electrode housing 44 shown in FIG. 2.

The lower section 80 of support structure 70 tapers at an angle of 7.0 degrees before continuing on with a uniform cross sectional area of 5.0 by 5.0 centimeters. The lower section 80 is roughly 5.0 centimeters high, with the portion of the lower section that is uniform in cross section being roughly 3.0 centimeters high. The bottom of lower section 80 is open, defining a water inlet 86. A second opening is provided on one side of the lower section 80 adjacent to, and at a right angle with, water inlet 86, defining a water return port 88.

The damper 72 is included in electrode assembly 68 to help ensure that all of the water flowing from source 12 to environment 14 is electrolytically treated, while still allowing passive circulation to be effected. Damper 72 is shown in greater detail in FIG. 6 and includes a damper plate 90, hinge pins 92, weighted deflector 94, and stop 96.

The damper plate 90 is a substantially rectangular element having dimensions of roughly 3.8 by 4.1 by 0.2 centimeters. The damper plate 90, as well as the other components of damper 72, may be made of, for example, PETG. The hinge pins 92 are axially aligned adjacent to one end of the damper plate 90 and are received in openings provided in the lower section 80 of support structure 70, adjacent to the water return port 88. As a result, the damper plate 90 is pivotable between a first position, in which the water inlet 86 is substantially closed and the return port 88 is substantially open, and a second position, in which the water return port 88 is substantially closed and the water inlet is substantially open. The damper plate 90, thus, may be referred to as including an inlet face 98 and return face 100.

The weighted deflector 94 is centrally positioned on the inlet face 98 damper plate 90. The weighted deflector 94 is substantially triangular in cross-section and includes an inclined face 102 against which the force of water passing through the water inlet 86 may be directed. The gravitational force applied to deflector 94, along with the relative position of the deflector 94 with respect to damper plate 90, cause the damper plate 90 to fall or rotate from the second position to the first position when active water flow through assembly 68 ceases, as will be described in greater detail below.

Figure 6:
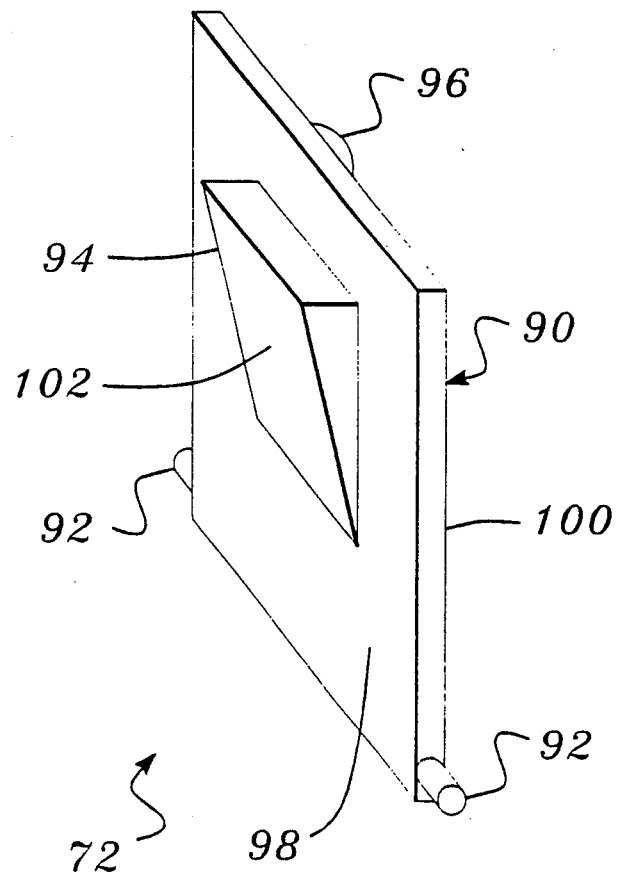
FIG. 6 is a more detailed illustration of the damper included in the electrolytic cell of FIG. 5.

The stop 96 included on damper 72 is located on the return face 100 of damper plate 90. Stop 96 is positioned at the end of the damper plate 90 opposite hinge pins 92. As shown in FIG. 6, the stop 96 spaces the damper plate 90 from the wall of the lower section 80 when the damper 90 is in the second position. Thus, as will be described in greater detail below, the damper plate 90 is prevented from assuming an entirely vertical position, allowing the weighted deflector 94 to more readily return damper plate 90 to the first position when active water flow stops.

The final components of the electrode plate assembly 68 to be discussed are the electrode plates 74. Although these plates may be constructed and operated in any of a variety of fashions, in the preferred arrangement, their design and use are substantially the same as described in conjunction with electrode plates 46.

Turning now to a discussion of the operation of the electrode plate assembly 68 in a cell 26 coupled to a control circuit 28, the operation closely parallels that described above. The controls 24 of the fluid source 12 initiate active flow by causing the pump 20 to draw fluid from reservoir 18 and pump it cell 26. The controller 62 and control circuit 28, in turn, cause current from the DC power supply 60 to pass through the switching circuit 64 to the various electrode plates 74.

As will be appreciated, the force of the active water flow through inlet 86 is directed against the inclined face 102 of the damper deflector 94, maintaining damper 72 in the second position. As a result, the damper 72 presents little impediment to active water flow. By blocking the water return port 88, however, the damper ensures that substantially all of the water introduced into electrode assembly 68 is required to traverse the electrode plates 74.

At some point, the controls 24 in fluid source 12 may cause pump 20 to shut off and valves 22 to close. At that time, the electrode assembly 68 is used in a passive circulation and filtration mode. With water pressure no longer applied to the inclined face 102 of damper 72, the center of mass of damper 72 will be somewhat offset due to the weight and position of deflector 94. As a result, the damper 72 will fall to the first position, closing the water inlet 86 and opening the water return port 88.

The controller 62 will continue to cause electrical energy to be applied to the electrode plates 74 until the passive timer interval expires. The same types of thermal and oxygen gradients previously discussed are established, inducing passive circulation within cell 26. In that regard, however, water is now returned to the bottom of the electrode plates 74 via the water return port 88, which is open to the reservoir.

The inclusion of damper 72 advantageously provides a more tightly regulated operation than the arrangement shown in FIG. 2. As previously mentioned, the active flow path is more completely confined because the passive circulation path is closed off by the damper 72, ensuring more uniform treatment of water initially introduced into the assembly 68. The passive circulation path is also more tightly controlled by closure of the water inlet by damper 72, preventing water from migrating toward source 12.

Figure 7:
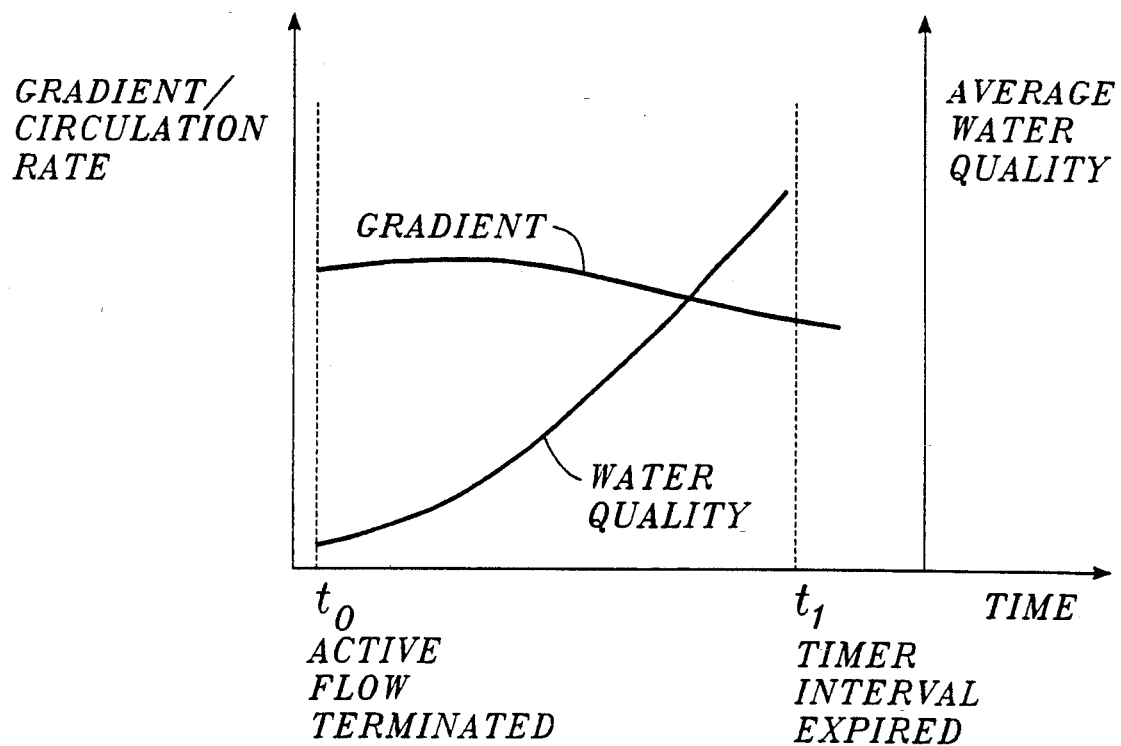
FIG. 7 is a graph illustrating the relationship between circulation, gradients, and time involved in the passive operation of the cell of FIG. 5.

A qualitative illustration of the relative influence of the damper's inclusion upon the operation of the cell is provided in FIG. 7. As will be appreciated by comparing the curves of FIG. 7 with those corresponding to the damperless embodiment of FIG. 6, the operation of damper 72 advantageously results in higher initial thermal and oxygen gradients and, hence, more rapid passive circulation initially. As a result, average water quality may also increase more quickly.

Figure 8:
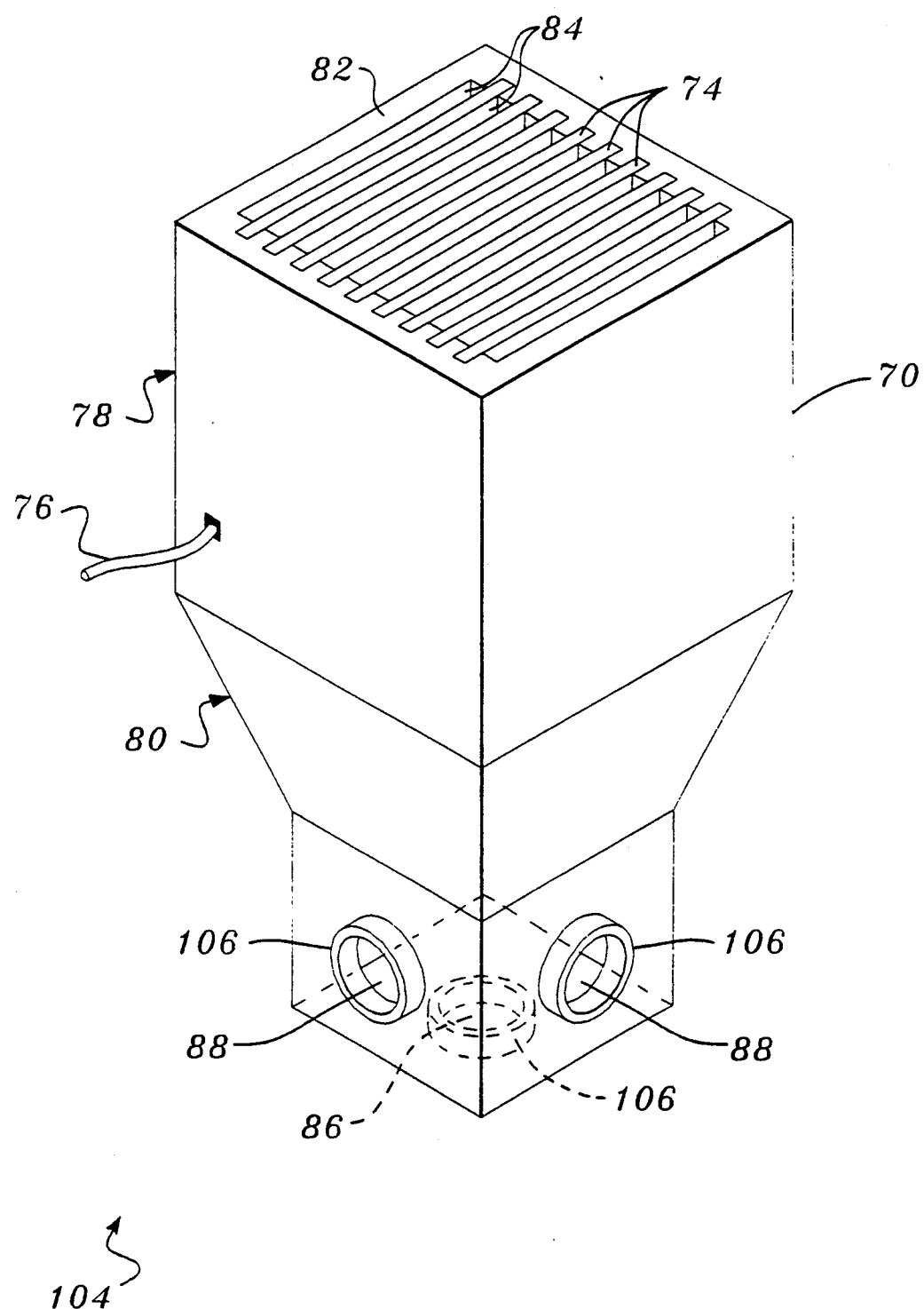
FIG. 8 is an illustration of a third embodiment of the electrolytic cell of FIG. 1, in which a plurality of remotely controlled valves are employed to define both active and passive fluid flow paths through the cell.

Referring now to FIG. 8, an alternative to the damper arrangement of FIG. 5 is shown employed in an electrode assembly 104. In that regard, a number of electrically responsive valves are employed to separately open and close the fluid inlet 86, as well as a plurality of water return or recirculation ports.

More particularly, the electrode assembly 104 shown in FIG. 8 is largely the same as the assembly 68 shown in FIG. 5, with like reference numbers indicating generally like construction of the two embodiments. As noted previously, however, the fluid inlet 86 is provided with an electromechanical valve 106, which can be opened and closed in response to inputs received from the controller 62 of control circuit 28. A water return port 88 is provided in each of the four sides of the lower section 80 of electrode support structure 70. Each of these ports 88 is fitted with a valve assembly 106, also under the control of controller 62.

As will be appreciated, during active operation, the four valves 106 controlling the water return ports 88 are closed and the valve 106 controlling the fluid inlet 86 is opened. As a result, water actively introduced into the cell must necessarily traverse the electrode plates. During passive operation, on the other hand, the inlet valve 106 is closed and the circulation port valves 106 are opened, allowing water to be recirculated within cell 26 by gradients established therein.

Although the arrangement shown in FIG. 8 is perhaps more complicated and expensive than that shown in FIG. 5, it does have several advantages. For example, the valves 106 are operable regardless of the cell's orientation, thus allowing electrode assembly 104 to be used in substantially any orientation within the tank 30. Further, by increasing the number of water return ports 88, the effective cross sectional area of the water return path can be increased, enhancing passive recirculation.

Figure 9:
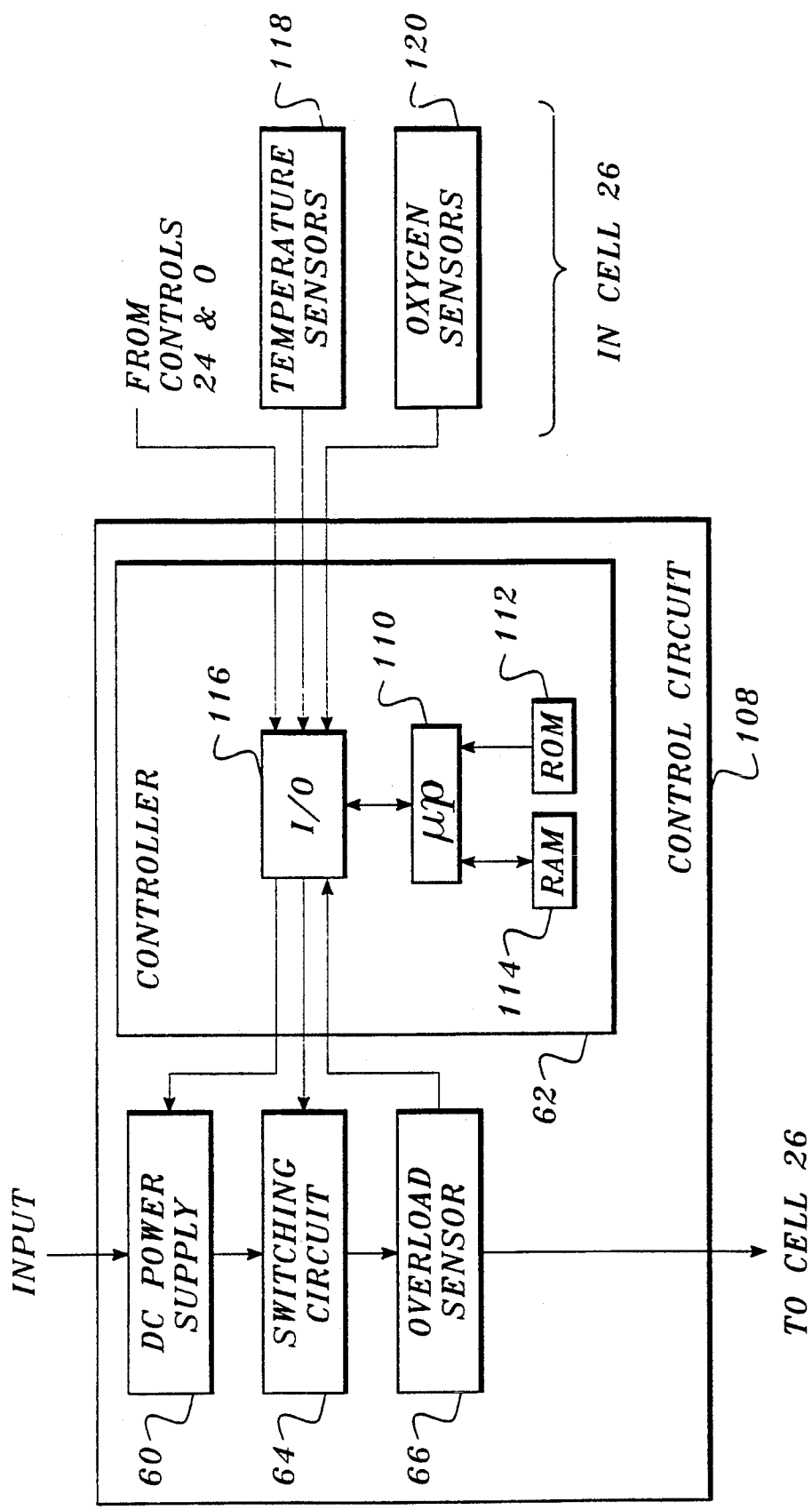
FIG. 9 is a block diagram of an alternative control circuit for use in conjunction with the cell of FIG. 8.

As with the alternative constructions of the electrolytic cell 26, the control circuit 28 may be varied. In that regard, FIG. 9 illustrates an alternative control circuit 108. The control circuit 108 includes the previously described DC power supply 60, controller 62, switching circuit 64, and overload sensor 66. The controller 62 also includes a number of additional components.

More particularly, a microprocessor 110 is employed to execute a plurality of software programs stored in a read only memory (ROM) 112. The microprocessor 110 is further coupled to a random access memory (RAM) 114 used to store information during processing. The microprocessor 110 is coupled to the remainder of control circuit 108 by an input/output circuit 116.

FIG. 9 also illustrates two additional components coupled to control circuit 108, but positioned in cell 26. In that regard, one or more temperature sensors 118 may be included in the tank 30 to monitor temperature gradients within the tank 30. As will be appreciated, the temperature sensors may be, for example, thermocouples. Similarly, oxygen sensors 120 may be included at various locations throughout the tank 30 to measure oxygen gradients within the housing.

In addition to the various modes of operation previously described in conjunction with control circuit 28, the control circuit 108 is programmed to process the inputs from sensors 118 and 120 to perform temperature gradient monitoring, oxygen level monitoring, and oxygen gradient monitoring. The control circuit 108 may be further programmed to provide, for example, passive circulation rate control and shutoff control.

Reviewing each of these different modes of operation individually, in a temperature gradient monitoring mode, the program instructions stored in ROM 112 cause microprocessor 110 to poll the outputs from the spatially distributed temperature sensors 118 to produce an indication of the temperature gradient established within tank 30 during the passive mode of operation. If, for example, one temperature sensor is included at the bottom of tank 30 and another is included at the top of tank 30, the temperature gradient is computed by taking the difference between the two sensors' outputs, which may need to be correlated against empirically derived data comparing computed differences with measured temperature gradients. The temperature gradient is stored by microprocessor 110 in RAM 114.

The microprocessor 110 similarly employs a set of program instructions stored in ROM 112 to determine oxygen gradients from, for example, oxygen sensors located at the bottom and top of tank 30. In addition, the microprocessor 110 may average the sensor outputs to store an average oxygen level representative of the filtration, purification, or quality level of the water being passively circulated in RAM 114.

With information concerning the gradients produced and oxygen level available, the microprocessor 110 may be programmed to terminate passive circulation and filtration in response to one of these parameters, rather than the expiration of some predetermined timer interval. For example, the microprocessor 110 may be programmed to provide an output to switching circuit 64 terminating passive circulation when a predetermined average oxygenation level is established, indicating that the water has been adequately treated. Similarly, the microprocessor 110 may provide an output to switching circuit 64 when a predetermined gradient is achieved.

As another alternative, the microprocessor 110 may be programmed to use information regarding the gradients established to control the rate of passive circulation. In that regard, if the filter system 16 is operated intermittently between active and passive modes, in some instances the active modes may be spaced apart by relatively long intervals of time, allowing the water in tank 30 to become fully circulated and treated even at relatively low passive circulation rates. On the other hand, if the active modes of operation are more closely spaced, it may be desirable to accelerate the rate of passive circulation to allow the water to be adequately treated prior to the next active mode interval.

As noted previously, the gradients monitored provide an indication of the passive circulation rate within the tank 30. With the actual rate of circulation known and the desired rate determined on the basis of the duty cycle of active and passive operation and the desired water quality, the microprocessor 110 can then be programmed to make the necessary adjustments in duty cycle in any of a variety of fashions. For example, the microprocessor 110 may alter the electrical energy applied to the cell 26 to control the heat delivered to the water and, hence, the thermal gradient and passive circulation rate.

When used in conjunction with a controllable valving scheme such as that illustrated in FIG. 8, the microprocessor 110 may be further used to regulate the operation of valves 106. More particularly, the number of recirculation ports opened may be altered or the relative opening at each port may be controlled. By effectively increasing or decreasing the cross sectional area of the recirculation path, the desired control of the passive circulation rate can be achieved.

Those skilled in the art will recognize that the embodiments of the invention disclosed herein are exemplary in nature and that various changes can be made therein without departing from the scope and the spirit of the invention. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A system for filtering a fluid, said system comprising:
    storage means for receiving the fluid; and
    passive filtration and circulation means for filtering the fluid and for producing a gradient in the fluid that induces circulation of the fluid in said storage means, wherein said passive filtration and circulation means comprises:
    at least one pair of electrodes;
    a housing including an inlet port, an outlet port, and a recirculation port, said housing being positioned within said storage means, said at least one pair of electrodes being positioned within said housing; and
    a damper for controlling the alternative introduction of fluid into said housing via said inlet port and said recirculation port.

2. The system of claim 1, wherein said damper is movable between a closed position, in which fluid may be introduced into said housing via said inlet, and an open position, in which fluid may be introduced into said housing via said recirculation port.

3. The system defined in claim 1, including means for selectively introducing the fluid into the housing through the inlet port and for simultaneously withdrawing the fluid from the storage means for active circulation of the fluid through the housing between the inlet port and the outlet port, and means for closing at least one of the inlet and outlet ports to stop such active circulation of the fluid and to achieve passive recirculation of the fluid resulting from the gradient produced by the passive filtration and circulation means.

4. The system defined in claim 3, in which the storage means defines a first active circulation path extending through the inlet port and the outlet port and a second passive recirculation path within the storage means, the recirculation port being disposed in the second path, and the pair of electrodes being disposed in both said first path and said second path for electrolytic treatment of the fluid.

5. A system for filtering a fluid, said system comprising:
    storage means for receiving the fluid; and
    passive filtration and circulation means for filtering the fluid and for producing a gradient in the fluid that induces circulation of the fluid in said storage means, wherein said passive filtration and circulation means include means for increasing the temperature of at least some of the fluid and wherein said gradient is a thermal gradient.

6. The system defined in claim 5, in which the passive filtration and circulation means includes a housing positioned within the storage means, said housing and the storage means having adjacent walls spaced relatively apart, the storage means and the passive filtration and circulation means defining a continuous recirculation path through said housing and between said walls.

7. A system for filtering a fluid, said system comprising:
    storage means for receiving the fluid; and
    passive filtration and circulation means for filtering the fluid and for producing a gradient in the fluid that induces circulation of the fluid in said storage means, wherein said passive filtration and circulation means includes means for increasing the oxygen level of the fluid and wherein said gradient is an oxygen gradient.

8. The system defined in claim 7, in which the passive filtration and circulation means includes a housing positioned within the storage means, said housing and the storage means having adjacent walls spaced relatively apart, the storage means and the passive filtration and circulation means defining a continuous recirculation path through said housing and between said walls.

9. A system for filtering a fluid, said system comprising:
    storage means for receiving the fluid; and
    passive filtration and circulation means for filtering the fluid and for producing a gradient in the fluid that induces circulation of the fluid in said storage means, wherein said passive filtration and circulation means comprises at least one pair of electrodes exposed to the fluid in said storage means.

10. The system of claim 9, further comprising sensing means for producing an output including information regarding the receipt of fluid by said storage means and control means for controllably supplying electrical energy to said pair of electrodes.

11. The system of claim 10, wherein said control means is further for interrupting the supply of electrical energy to said pair of electrodes some interval of time after the output of said sensing means indicates that fluid is no longer being received by said storage means.

12. The system of claim 11, wherein said control means establishes said interval of time in response to the output of said sensing means and the operation of said control means over some specified interval.

13. The system of claim 12, wherein said pair of electrodes may increase the oxygen level of the fluid said electrodes are exposed to, and wherein said control means further establishes said interval of time as a function of a desired oxygenation level to be produced in the fluid.

14. The system of claim 10, wherein said control means supplies electrical energy to said pair of electrodes for an interval of time during which the circulation of the fluid in said storage means is attributable to only said gradient.

15. The system defined in claim 9, in which the passive filtration and circulation means includes means for applying electric energy to the pair of electrodes to establish a gradient in the fluid, means for defining a first passive fluid flow path in the storage means to enhance the circulation of fluid in the storage means induced by the gradient, and means for defining a second active fluid flow path through the storage means.

16. The system defined in claim 15, in which the means for defining the second active fluid flow path includes an inlet port for introduction of fluid into the storage means, an outlet port for withdrawal of fluid from the storage means and means for selectively closing at least one of said ports.

17. A system for filtering a fluid, said system comprising:
storage means for receiving the fluid; and
passive filtration and circulation means for filtering the fluid and for producing a gradient in the fluid that induces circulation of the fluid in said storage means, wherein said storage means includes:
inlet means for allowing fluid to enter said storage means; and
outlet means for allowing fluid to exit said storage means, said storage means further including an active circulation path between said inlet means and said outlet means and also including a passive circulation path within said storage means.

18. The system defined in claim 17, including means for selectively closing at least one of the inlet means and outlet means to select between active circulation of fluid along the active circulation path and passive circulation along the passive circulation path.

19. A method of filtering a fluid which method comprises the steps of:
(1) storing the fluid in a storage tank;
(2) producing a gradient in the stored fluid in the storage tank to induce passive circulation of the fluid through a path within the storage tank; and
(3) filtering the fluid as it circulates by passing the circulating fluid through a filter contained within the storage tank without withdrawing fluid from the storage tank and without introducing fluid into the storage tank.

20. The method of claim 19, including in step (2) producing a thermal gradient in the storage tank to induce circulation of the fluid within the storage tank.

21. The method of claim 19, including in step (2) producing an oxygen gradient in the storage tank to induce circulation of the fluid within the storage tank.

22. The method of claim 19, wherein said steps of producing a gradient and filtering the fluid are performed by passing the fluid between electrolytic plates within the storage tank and supplying electrical energy to the plates.

23. The method of claim 22, wherein said step of filtering the fluid is performed until the fluid is filtered to a desired degree, and including stopping the supply of electric energy to the plates when the fluid has been filtered to the desired degree.

24. The method defined in claim 19, including:
(4) selectively actively circulating fluid through the storage tank by simultaneously introducing fluid into the storage tank and withdrawing fluid from the storage tank.

25. A method of controlling an electrolytic system for treating a fluid, said system being positioned in a fluid flow path and provided with an interruptible supply of fluid, said method comprising the steps of:
providing energy to the electrolytic system;
sensing an interruption in the supply of fluid to the flow path;
continuing to provide energy to the electrolytic system after sensing the interruption; and
thereafter terminating the step of providing energy to the electrolytic system some controllable interval of time after sensing the interruption.

26. The method of claim 25, further comprising the steps of:
treating fluid in the flow path;
monitoring the steps of treating and sensing; and
controlling the interval of time on the basis of the monitored steps of treating and sensing.

27. An electrolytic cell for use in processing a fluid that is receivable from a fluid source and transferable to a fluid receiving element, said fluid source being capable of actively supplying fluid to said cell, said system comprising:
a cell housing including a fluid inlet, a fluid outlet, a fluid recirculation port, and a fluid chamber, said fluid inlet being culpable to the fluid source, said fluid chamber defining an active fluid flow path between said fluid inlet and said fluid outlet and a passive fluid flow path between said fluid recirculation port and said fluid outlet;
at least one pair of electrodes positioned in said active and passive fluid flow paths defined by said fluid chamber; and
a recirculation port damper, positioned adjacent said fluid recirculation port and movable between a closed position, in which said damper substantially restricts fluid flow through said recirculation port, and an open position, in which said damper does not substantially restrict fluid flow through said recirculation port.

28. The cell of claim 27, wherein fluid flows along said active fluid flow path when said damper is in said closed position and along said passive fluid flow path when said damper is in said open position.

29. The cell of claim 28, further comprising a reservoir housing including a reservoir chamber and reservoir outlet, said cell housing being positioned within said reservoir chamber, said reservoir chamber defining a fluid flow path between said fluid outlet of said cell housing and said recirculation port of said cell housing, said reservoir outlet being culpable to the fluid receiving element.

30. The cell of claim 28, further comprising a control circuit for providing electrical energy to said pair of electrodes in a controllable fashion to electrolytically filter fluid flowing between said pair of electrodes.

31. The cell of claim 30, wherein said control circuit further includes a water flow sensor for determining whether fluid is being actively supplied to said cell from the fluid source and wherein said control circuit is for providing electrical energy to said pair of electrodes an interval of time after said sensor determines that fluid is no longer being actively supplied to said cell.

32. The cell of claim 28, further comprising means for controlling the position of said damper.

33. The cell of claim 27, wherein said recirculation port damper is further positioned adjacent said fluid inlet, said damper substantially restricting fluid flow through said fluid inlet when said damper is in said open position and not substantially restricting fluid flow through said fluid inlet when in said closed position.

* * * * *